United States Patent [19]
Kumar et al.

[11] Patent Number: 5,371,348
[45] Date of Patent: Dec. 6, 1994

[54] PORTABLE DEVICE FOR HANDSFREE DATA ENTRY WITH VARIABLY-POSITIONABLE DISPLAY/SCANNER MODULE DETACHABLE FOR HANDHELD USE

[75] Inventors: Rajendra Kumar; George D. V. Ritchie, both of Akron, Ohio

[73] Assignee: Khyber Technologies Corporation, Fairlawn, Ohio

[21] Appl. No.: 962,294

[22] Filed: Oct. 16, 1992

[51] Int. Cl.5 .............................................. G06K 7/10
[52] U.S. Cl. ..................................... 235/472; 235/462
[58] Field of Search ............................... 235/462, 472

[56] References Cited

U.S. PATENT DOCUMENTS

| | | | |
|---|---|---|---|
| 4,251,798 | 2/1981 | Swartz et al. | |
| 4,387,297 | 6/1983 | Swartz et al. | 235/462 |
| 4,460,120 | 7/1984 | Shepard et al. | 235/472 |
| 4,621,189 | 11/1986 | Kumar et al. | 235/472 |
| 4,758,717 | 7/1986 | Shepard et al. | 235/472 |
| 4,916,441 | 10/1990 | Gombrich | 235/472 |
| 4,983,818 | 1/1991 | Knowles | 235/472 |
| 5,006,699 | 4/1991 | Felkner | 235/472 |
| 5,021,642 | 6/1991 | Chadima, Jr. et al. | 235/472 |
| 5,023,824 | 6/1991 | Chadima, Jr. et al. | 364/708 |
| 5,182,291 | 2/1993 | Siemiatkowski | 235/472 |
| 5,191,197 | 3/1993 | Metlitsky | 235/472 |

OTHER PUBLICATIONS

Advertisement for Model LS 2000 Series, Symbol Technologies, Inc. (1990).
Advertisement for Model LRT-3800, Symbol Technologies, Inc. (1991).
Advertisement for Model PTC-960, Texlon Corporation (1990).
Advertisement for Model PSC 5300, Photographic Sciences Corporation (1991).
Advertisement for Model BHT-2000 Bar-code Handy Terminal, Nippondenso Co., Ltd. (1991).
Article entitled "Wireless Device To Automate Retail Tasks", *PC Networking*, p. 44, Jan. 27, 1992.

*Primary Examiner*—Harold Pitts
*Attorney, Agent, or Firm*—Michael Sand Co.

[57] ABSTRACT

A portable device (10) for data collection by an operator (11) includes a data entry unit (12) for entry of data other than by scanning and a module (14) having a display (50) for display of information and a scanner (51) or other auto-identification device for data collection. Data entry unit (12) operates both when carried by hand and while carried on operator (11) other than by hand. Module (14) is detachably carried by data entry unit (12) and operates both while module (14) is carried by data entry unit (12) and while detached therefrom. Data entry unit (12) includes a module carrier (70) for adjustably, detachably carrying display/scanner module (14). Because module (14) includes both a display and scanner, both are always within the line of sight of operator (11), greatly facilitating use of device (10). Because data entry unit (12) includes the remaining components, module (14) is lightweight and may be used for long periods without fatigue.

17 Claims, 7 Drawing Sheets

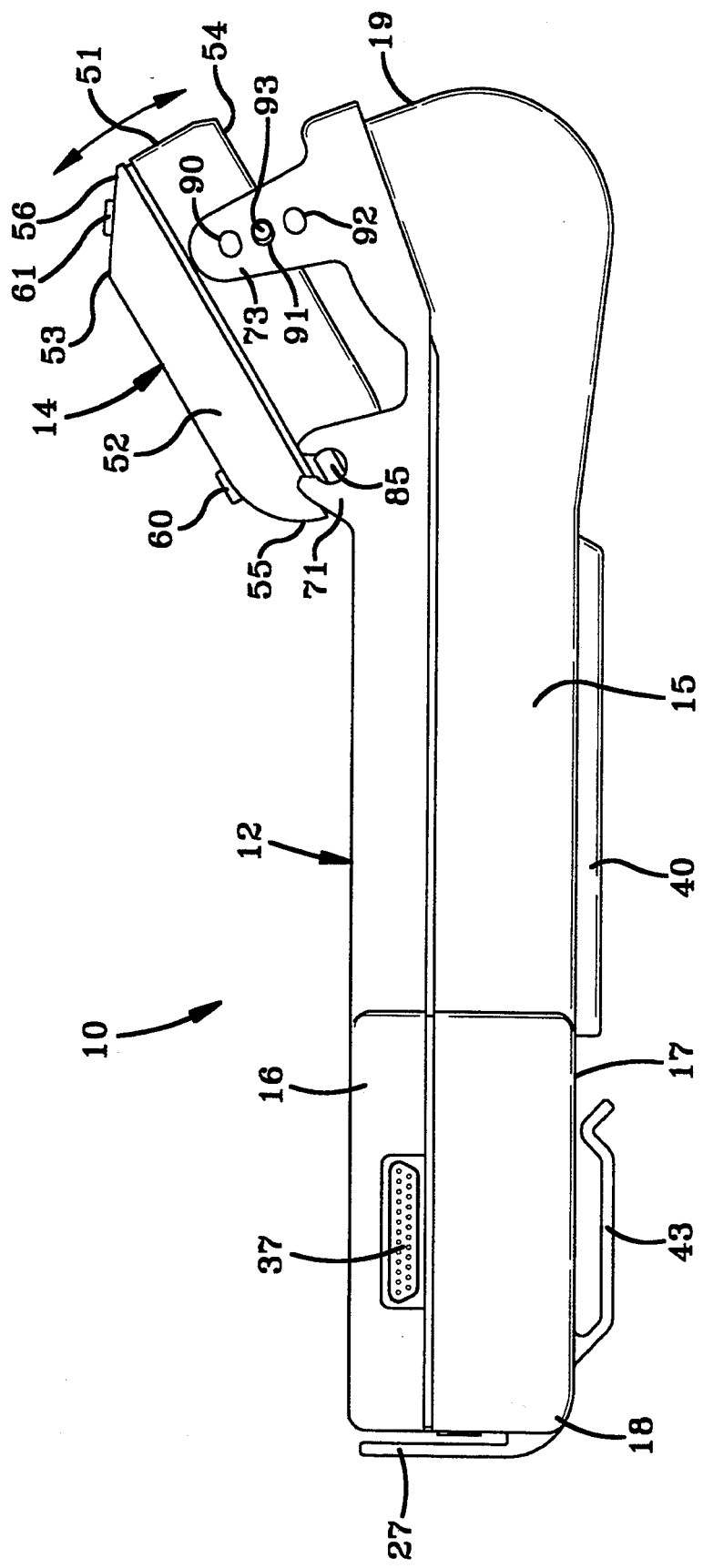

PORTABLE DEVICE FOR HANDSFREE DATA ENTRY WITH VARIABLY-POSITIONABLE DISPLAY/SCANNER MODULE DETACHABLE FOR HANDHELD USE

TECHNICAL FIELD

The present invention relates in general to devices for data collection. More particularly, the present invention pertains to portable devices for data entry and remote automatic identification. More specifically, the present invention relates to portable devices for data collection suitable without modification for multiple applications including automatic article identification, data collection and control for inventory and surveillance purposes, and point of sale transaction processing.

BACKGROUND ART

Portable data collection devices have been developed for a wide variety of applications and are becoming increasingly popular as a cost effective mechanism by which to perform a number of essential business activities. While the specific features of such devices vary dependent upon the application, nearly all are designed for and require hand-held rise. Virtually all such devices include a microprocessor based control unit, and further include or provide for the optional attachment of an electromagnetic, laser or CCD scanner for automatic identification of items on which suitable, corresponding electromagnetic or optical identifiers such as tags or bar-code labels have been placed.

For example, portable devices intended to support inventory data collection and control functions such as automatic product identification and price correlation require hand-holding of at least a control unit having a keypad for manual data input and a display, leaving an operator with at most one hand free for other application processing tasks. A scanner having a laser or CCD scan head may be electrically connected by cable to the control unit (such as the Model LS 2000 Series commercially available from Symbols Technology, Inc. of Bohemia, N.Y.). Alternatively a separate scanner (such as disclosed in U.S. Pat. Nos. 5,021,642; 4,758,717; 4,460,120; 4,387,297; or 4,251,798) may be physically incorporated within the control unit. Typical of the latter is the Model LRT-3800 manufactured by Symbol Technologies, Inc. of Bohemia, N.Y.; the Model PTC-960 provided by Telxon Corporation of Akron, Ohio; and the Model PSC 5300 from Photographic Sciences Corporation of Webster, N.Y. which is available with an optional integral display.

Whether devices such as these are operable or convenient for use in particular applications requires consideration of the features each posses, how each is carried by the operator, and its size, weight and visual usage. For example, where one or both of an operator's hands must be used to support the device and any attachments, the device may not be operable as a portable POS terminal because the operator may be unable to hold or position for scanning a product for sale. Also, the larger or heavier the device, the less desirable or practicable for applications requiring long periods of hand-held support by an operator. Indeed when certain features (like wireless transceivers and printers) that are necessary for various applications are included, the devices become so large and heavy that even hand-grip pedestals furnished to facilitate scan positioning are inadequate for long-term operator support.

Among the least appreciated, but possibly most significant usage consideration for applications requiring, and devices including a scanner, is the visual relationship between the display, scanning beam and operator's line of sight. In those instances, correct alignment of the beam to the tag or label target is imperative for successful operation. For this to be effectively accomplished, the positions of the scanning beam and the target must be known to and simultaneously within the operator's line-of-sight. Many applications also necessitate contemporaneous reading of the display by the operator in order to receive certain processing information, as when the operator wishes to confirm entry of a correct product code by a bar code scanner or confirm related information such as shelf pricing.

Presently the only devices allowing simultaneous line-of-sight viewing of the scanning beam and display during use are those devices where the scanner is integrally incorporated into the control unit with the display, such as Symbol Technologies' Model LRT-3800, Telxon's Model PTC-960, Photographic Sciences' Model PSC 5300, and the Model BHT-2000 Bar-code Handy Terminal more recently made commercially available in the United States by the Nippondenso ID Systems division of Toyota Tsusho America Inc. of San Mateo, Cal. Unfortunately the weight and size of these devices often makes optimal beam positioning difficult or impracticable and renders them effectively inoperable for various applications as portable POS where the operator's hands are required for other activities during operation.

U.S. Pat. Nos. 4,923,818 and 4,621,189 disclose portable data entry devices with scanner heads that are detachable from the control unit upon which they are mounted during operation to allow a reversal of the direction of beam projection. However, these devices will not operate while the scanning head is detached and otherwise suffer from all the same deficiencies as the devices noted hereinbefore.

Thus, despite the increased popularity and desirability of portable data entry devices to perform an ever increasing range of tasks, no device has been provided that is readily capable of use in more than a limited number of applications, particularly with any significant extent of operator flexibility.

SUMMARY OF THE INVENTION

It is, therefore, an object of the present invention to provide a portable device for data collection by an operator having sufficient flexibility to allow operator use in a variety of applications.

It is another object of the present invention to provide a device, as set forth above, operable both when carried by hand and while carried on the operator other than by hand.

It is still another object of the present invention to provide a device, as set forth above, wherein during operation the scanning beam and display are within the operator's line-of-sight for simultaneous viewing and are variably-positionable to facilitate optimal utilization, and operator convenience and comfort.

It is yet another object of the present invention to provide a device, as set forth above, that is relatively compact and lightweight, further facilitating optimal utilization, and operator convenience and comfort.

These and other objects and advantages of the present invention over existing prior art forms will become more apparent and fully understood from the following description in conjunction with the accompanying drawings.

In general, in accordance with the present invention, a portable device for data collection by an operator includes a data entry unit for entry of data other than by scanning, and a module for display of information and data collection by scanning. The data entry unit is operable both while the data entry unit is carried by hand and while carried on the operator other than by hand. The module is detachably carried by the data entry unit and is operable both while the module means is carried by the data entry unit and while detached from the data entry unit. The module receives display information from the data entry unit and furnishes data collected by scanning to the data entry unit.

BRIEF DESCRIPTION OF THE DRAWINGS

FIGS. 4 and 4A are side views of the exemplary device shown in FIG. 1 depicting the sequence of attachment of the display/scanner module to the data entry unit and adjustment of the position of the same to select the operator viewing angle of the display and the scan beam.

PREFERRED EMBODIMENT FOR CARRYING OUT THE INVENTION

Figure 1:
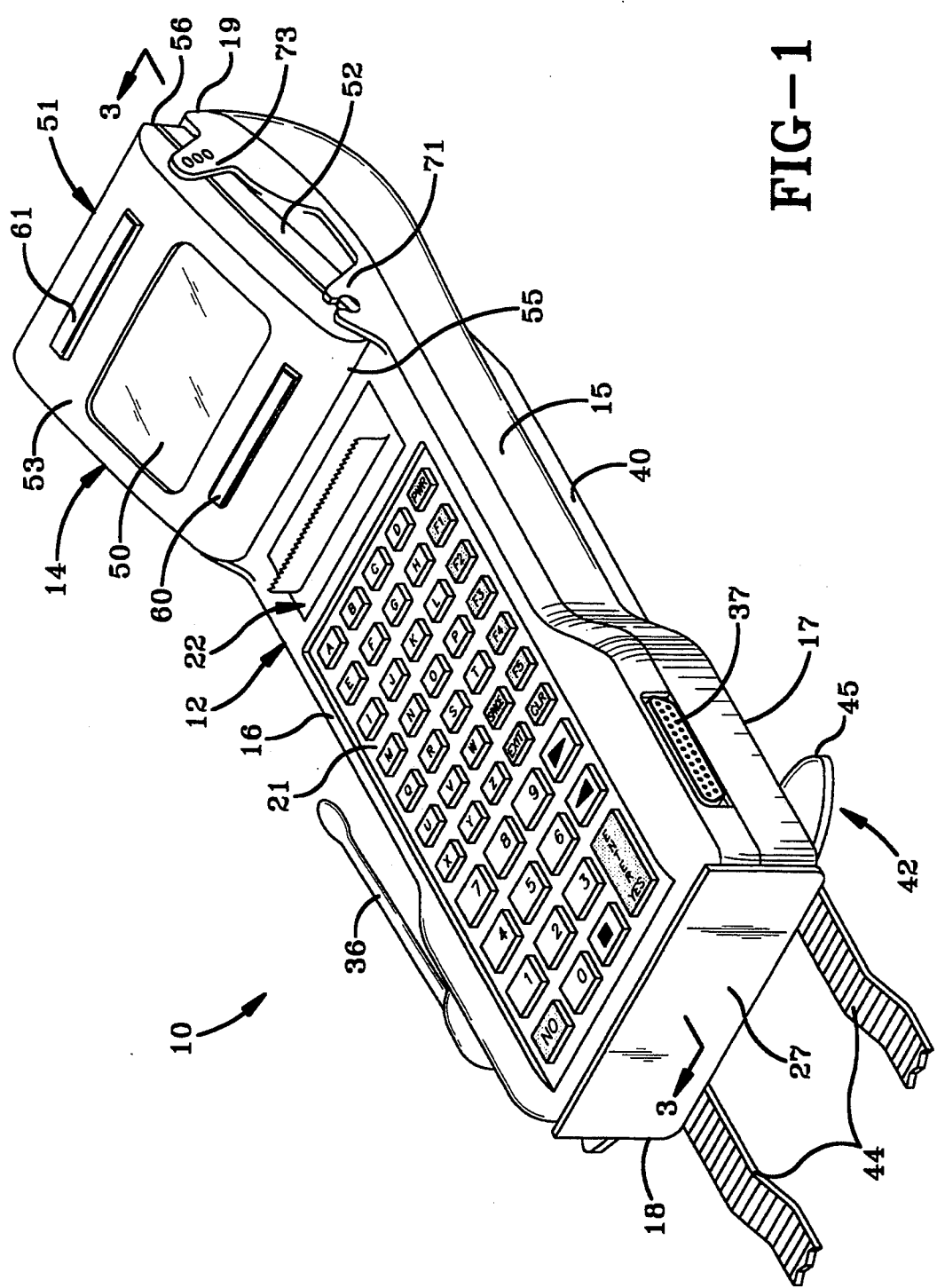
FIG. 1 is a top perspective view of an exemplary device in accordance with the present invention depicting a display/scanner module adjustably carried by the data entry unit.
Figure 5:
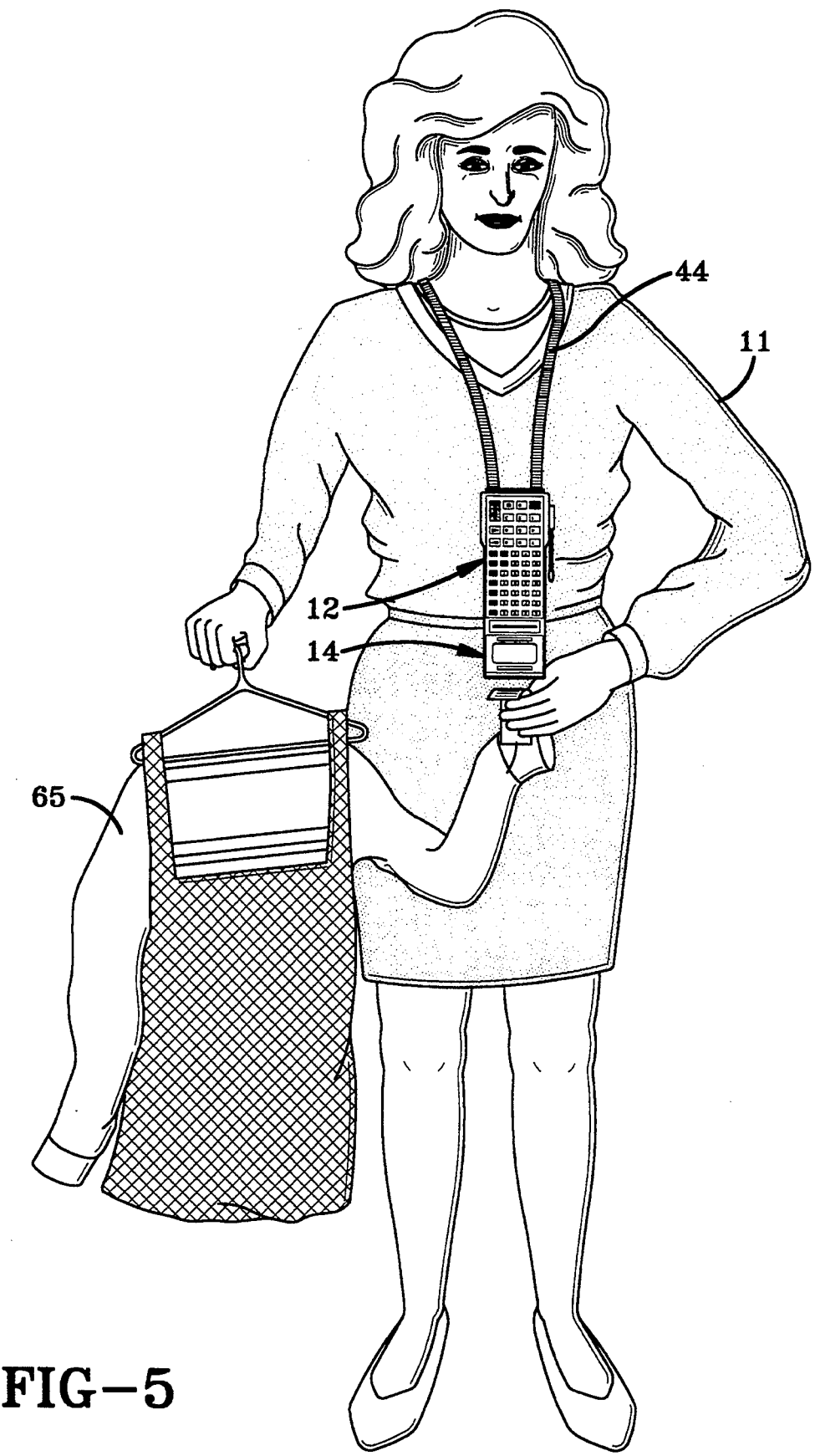
FIG. 5 is pictorial view of an operator carrying the exemplary device shown in FIG. 1 without the use of hands, which are used to carry and position the article for auto-identification by the scanner, and the convenient visual alignment of the display and scan beam.
Figure 6:
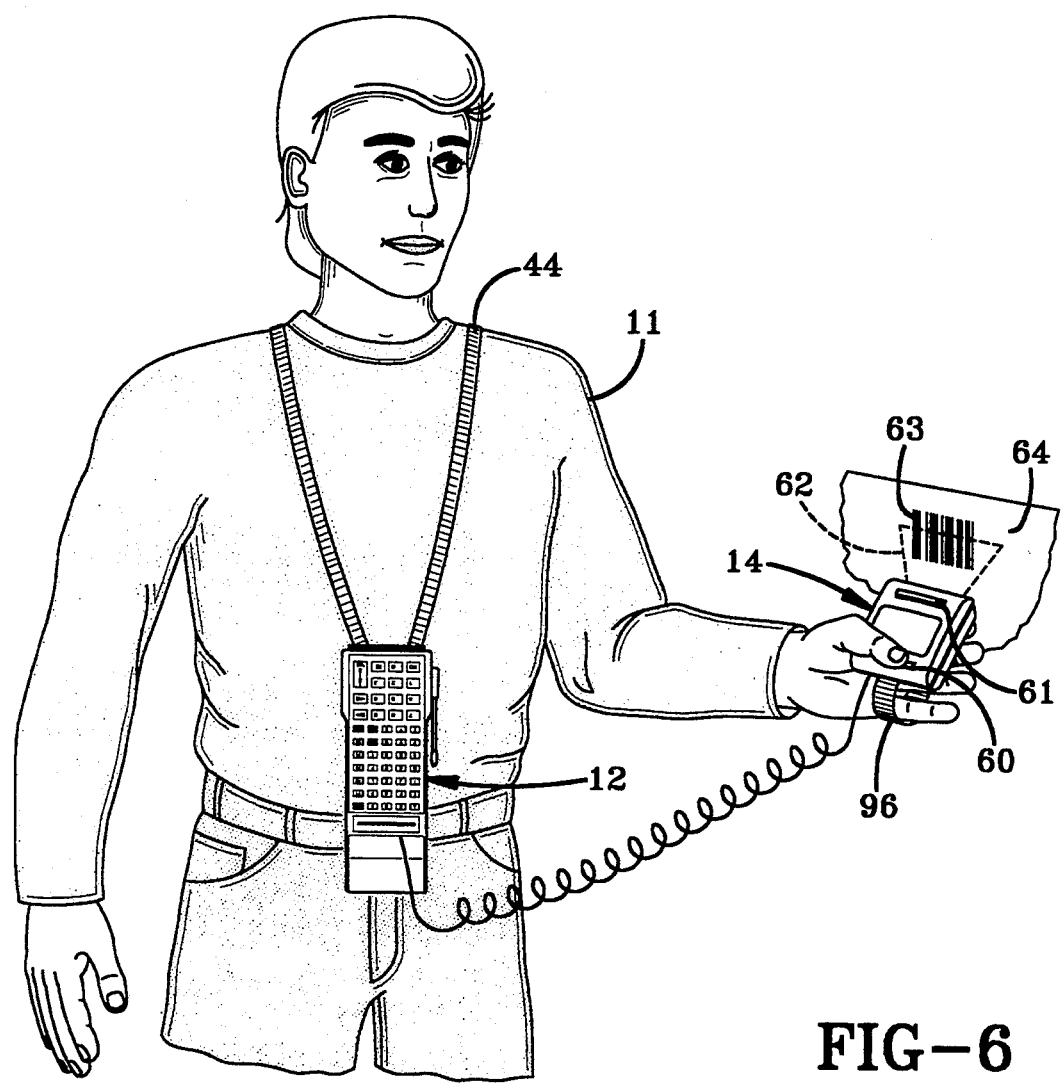
FIG. 6 is a pictorial view of an operator carrying the exemplary data entry unit shown in FIG. 2 without the use of hands. In this mode of operation one hand carries the display/scanner module detached from the data entry unit, allowing scanning automatic identification information on articles without having to pick them up.

FIG. 1 presents in perspective an exemplary portable device in accordance with the present invention, generally indicated by the numeral 10, for data collection by an operator 11 (shown in FIGS. 5 and 6). Device 10 broadly includes a data entry unit 12 and a variably-positionable display/scanner module 14 detachably carried by data entry unit 12 for handheld use, as perhaps better seen in FIG. 2.

Figure 3:
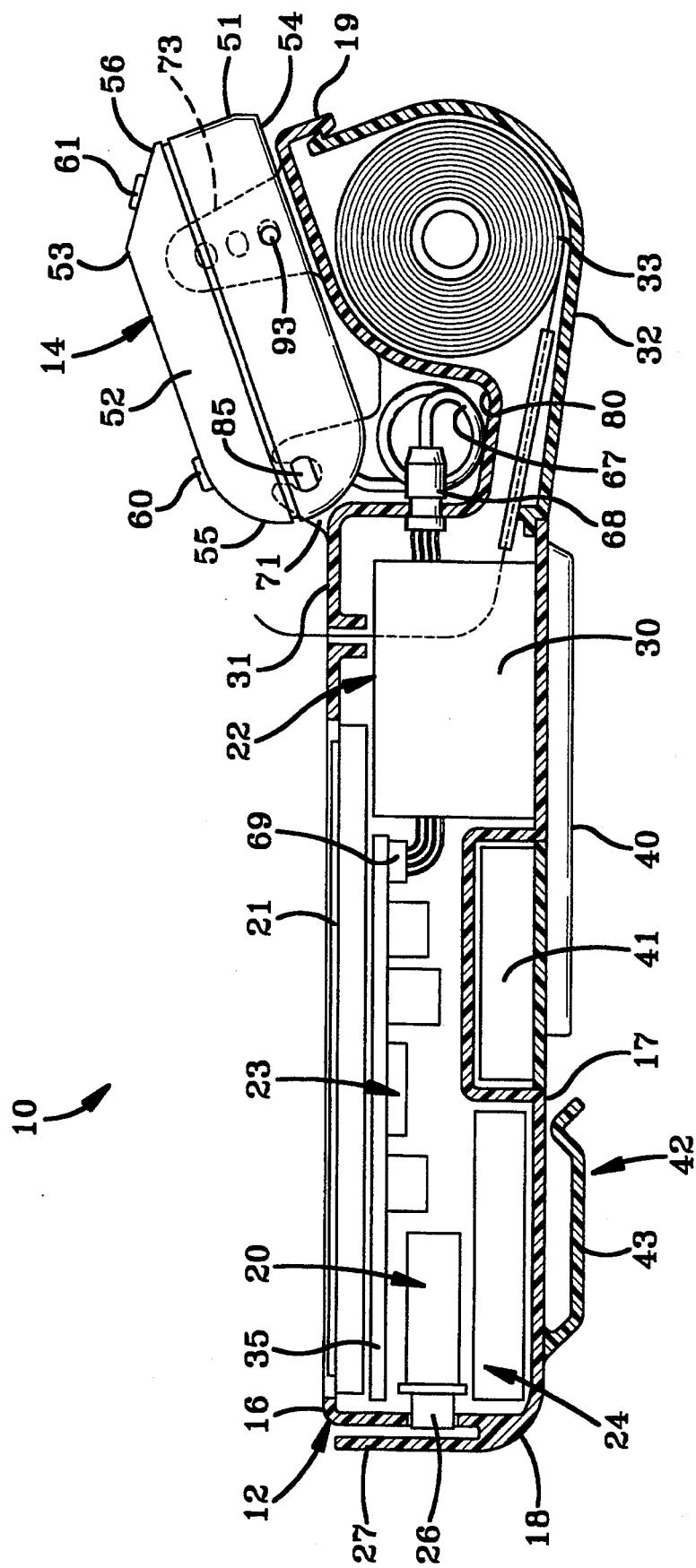
FIG. 3 is a vertical sectional view of the exemplary device shown in FIG. 1 taken substantially along line 3—3 shown in FIG. 1.

Data entry unit 12 may include within a single data entry unit housing 15 several separate components furnishing various functions including data entry other than by scanning, data storage and processing, data communication, and receipt or other data record printing. In the exemplary embodiment depicted in the Figures, data entry unit 12 includes a magnetic card reader 20, data entry keyboard 21, printer assembly 22, processor assembly 23 and communications assembly 24, as best seen in FIGS. 1 and 3. Data entry unit housing 15 may be formed by molding or other acceptable means of a suitable material such as a rigid plastic suitable to integrally carry all the components in a substantially rectangular block having a top surface 16, a bottom surface 17, a first end 18 and a second end 19. The width of data entry unit housing 15 should be about what may be comfortably grasped in a human operator's hand, less than about four inches (10.16 cm).

Magnetic card reader 20 may be any conventional reader suitable for reading information encoded on a card magnetic stripe and carried and mounted by means not relevant hereto within data entry unit housing 15 so as to allow operator 11 to wipe the magnetic stripe of the card across the exposed reading head 26 of magnetic card reader 20. Of course, where device 10 is to be used with a card employing a different information encoding method, such as optical or electrical, another card reader 20 may be appropriately selected to respond to such other encoding method. A substantially planer card guide 27 for directing the card and its magnetic stripe into operative engagement with reading head 26 may be furnished and connected to or integrally formed with data entry unit housing 15.

Data entry keyboard 21 may be a conventional data entry mechanism, such as a keyboard with raised, travel-tactile keys or a substantially flat membrane keyboard having a mylar, customizable, user-interchangeable keypad cover suitable for entry of the desired information and device commands.

Printer assembly 22 may include any conventional printer 30 sufficiently small to fit within the available space in data entry unit housing 15, a paper exit cover 31 and a printer paper holder 32 carrying a supply of paper 33. One suitable compact impact printer 30 is dot matrix printer Model M-180 Ultra Small-Sized Printer available from Epson America Inc. of Torrance, Cal., and is capable of printing 24 characters per line on 2.26 inch (5.74 cm) wide two-ply paper. Printer 30 is carried within and mounted by means not relevant hereto to data entry unit housing 15 such that paper exiting printer 30 passes directly to paper exit cover 31.

Processor assembly 23 may be mounted upon a printed circuit board 35 and may include any conventional central processing unit (CPU), microprocessor or microcomputer having sufficient capacity to control operation of device 10, memory to retain the control program and an input/output circuit for receiving and conditioning all control and data signals (not shown).

Communications assembly 24 allows device 10 to transmit data and instructions to and from a remote data logging and/or control system. Where device 16 is employed as a point of sale terminal, communications assembly 24 allows device 10 to obtain approval of credit card transactions. Any of the known methods of wireless or wire communications may be provided. For example, communications assembly 24 may include a conventional radio frequency transceiver, preferably employing spread spectrum modulation and optionally having an external antenna 36, to send the information necessary for approval to a base station (not shown) including a like transceiver, central processing unit, memory and input/output circuit which may be optionally connected to a telephone line. A data jack 37 suitable for direct serial data transmission may be provided in device 10 to effect transfer via cable. A modem and telephone jack may be installed within device 10, and device 10 plugged directly into the public telephone network.

Data entry unit 12 may include a caddy 40 to provide a storage chamber for printed records, a self-contained energy source such as batteries 41, and will include one or more mechanism 42 for handsfree carrying of device 10 by operator 11. One such handsfree carrying mechanism may be a flexible clothing (including belt) hook 43 that may be attached to data entry unit housing 15 as shown in FIG. 3 for removable connection to an article of clothing. Another handsfree carrying mechanism may be a neck strap 44 the ends of which are secured to the opposite ends of a closure bar 45 that is slid under clothing hook 43.

Display/scanner module 14 includes a display 50 and an auto-identification mechanism such as a CCD or laser scanner 51 or radio frequency transponder. A single module housing or case 52 carries display 50 and scanner 51 or other auto-identification mechanism. Module case 52 may be formed by molding or other acceptable means of a suitable material such as a rigid plastic suitable to integrally carry all its components in a configuration comfortable for hand holding as further explained below. An exemplary configuration illustrated in the Figures is a substantially square block having a top surface 53, a bottom surface 54, a first end 55 and a second end 56. The ends of top surface 53 adjoining first end 55 and second end 56 may be beveled to facilitate hand holding, push button actuation, and/or light scanning beam positioning.

Display 50 may be any conventional display, preferably having low-power consumption such as a liquid crystal display, for visual depiction of operating mode status, operator prompts, or any acquired information. Display 50 faces out the top surface 53 of module 14 near the center thereof. Scan activation buttons 60, 61 are positioned to extend out the top surface 53 of display/scanner module 14 between display 50 and first end 55 and second end 56, respectively.

Scanner 51 may be a compact mechanism for facilitating acquiring information about the inventory or purchase item(s), such as the CCD scanning module manufactured by Opticon Inc. of Orangeburg, N.Y., or a diode laser scanning module such as that available through Photographic Sciences Corp of Webster, N.Y. Optically scannable barcodes, now almost always placed on retail and inventory product, provides a unique product identification. As shown in FIGS. 6 and 7 and explained more fully hereinbelow, scanner 51 generates a light scanning beam 62 for striking the barcode 63 applied to an item of inventory 64 or a product 65 to be purchased, its label or packaging. Scanner 51 is carried within module case 52 by suitable means (not shown or relevant herein) such that the light scanning beam 62 is projected outwardly from the second end 51 of module case 52 through a light transparent window (not shown).

Figure 2:
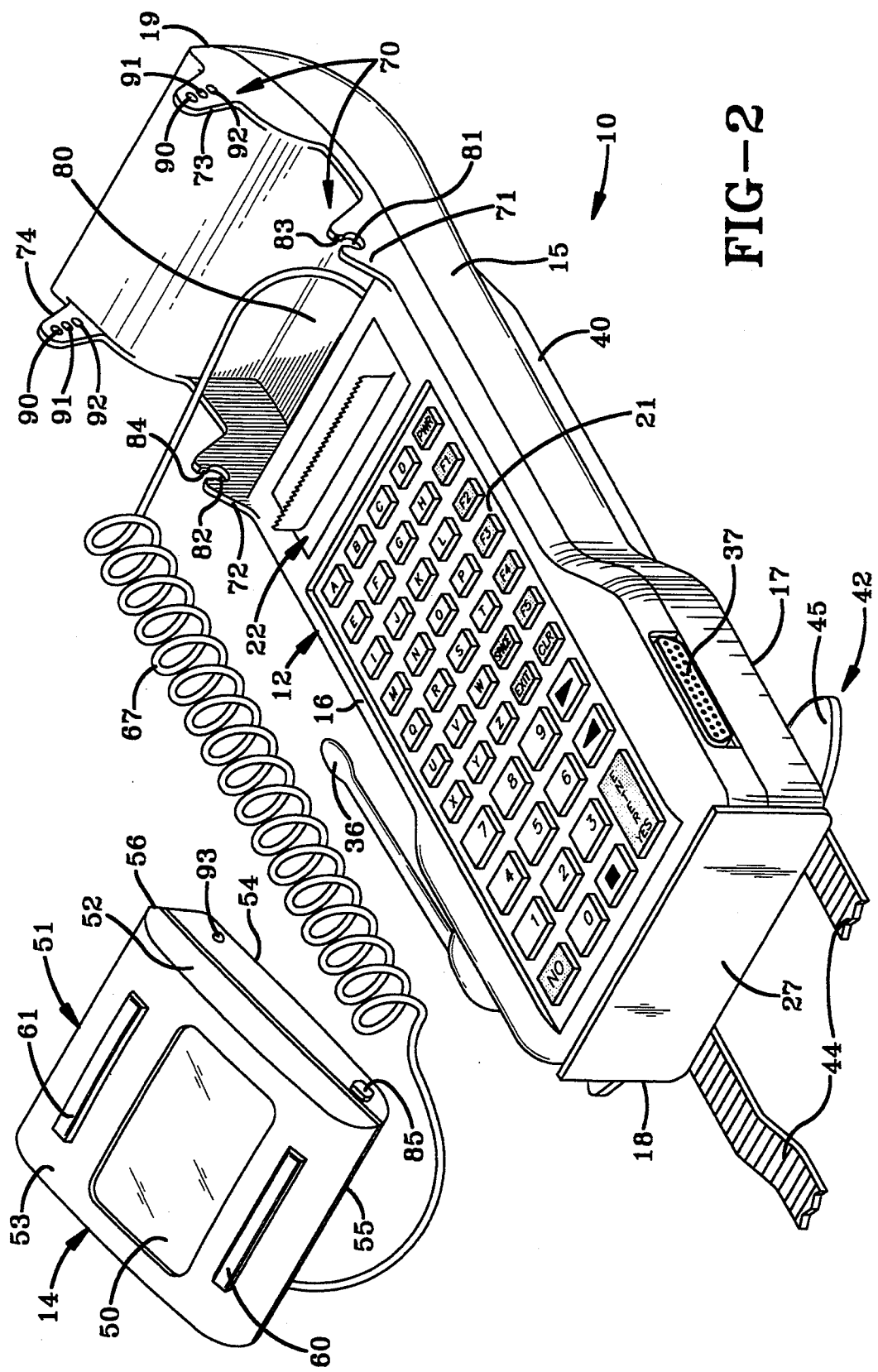
FIG. 2 is another top perspective view of the exemplary device shown in FIG. 1 depicting the display/scanner module detached from the data entry unit.

Display/scanner module 14 may be electrically operably connected to data entry unit 12 by any of a variety of wired or wireless techniques such as a multiple conductor coiled cord 67 passing through data entry unit housing 15 in a strain relief connector 68 and engaging printed circuit board 35 with a conventional connector 69, most readily seen in FIGS. 2 and 3. Wireless electrically operable connection may be achieved, for example, at radio or infrared frequencies. A wired connection allows display/scanner module 14 to obtain its necessary operating power from data entry unit 12, but limits the physical positioning of the display/scanner module 14, although employing a coiled wired connection helps minimize these physical limitations. While wireless connection eliminates the tether of a conductor, it requires display/scanner module 14 include its own source of power.

Data entry unit 12 also includes a module carrier 70 (FIG. 2) to adjustably, detachably carry the display/scanner module 14. Module carrier 70 is formed at the second end 19 of data entry unit housing 15 and includes a like pair of opposing pivot arms 71, 72 extending upwardly from the sides of data entry unit housing 15 at the top surface 16 thereof, and a like pair of opposing positioning arms 73, 74 in spaced relation to pivot arms 71, 72 extending upwardly from the sides of data entry unit housing 15 at the top surface 16 and closer toward the second end 19 thereof. A compartment 80 for storage of coiled cord 67 may be recessed into data entry unit housing 15 between printer paper holder 32 and printer 30 (FIGS. 3 and 4).

Figure 4:
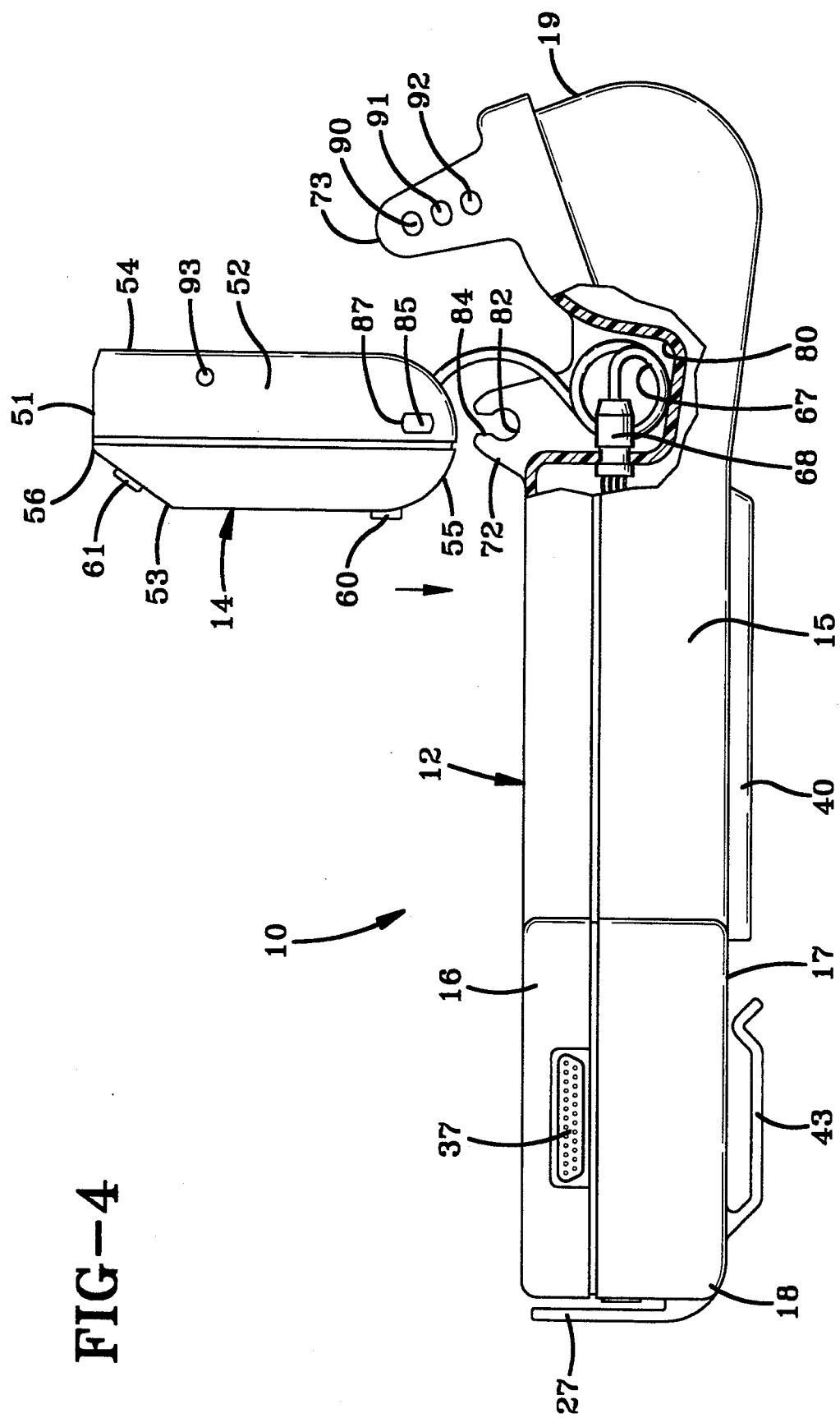

As most advantageously shown in FIGS. 4 and 2, pivot arms 71, 72 each include a substantially circular keyhole 81, 82, respectively, and a passageway or slot 83, 84, respectively having substantially parallel sideways oriented substantially perpendicular to the plane of data entry keyboard 21. A respective mating pivot pin 85, 86 is formed into each side of display/scanner module 14 for demountable, rotatably engaging keyholes 81, 82. Pivot pins 85, 86 may be substantially rectangular blocks 87 dimensioned to pass freely through slots 83, 84 when oriented substantially perpendicular to the plane of data entry keyboard 21 and rotate freely within keyholes 81, 82 without disengagement. The short sides of the blocks forming pivot pins 85, 86 are preferably rounded to facilitate the later free rotation. In order to best achieve the adjustable positioning explained further hereinbelow, pivot pins 83, 84 may be furnished or integrally formed in module case 52 on each side close to first end 55 and slightly below a point equidistant between top surface 53 and bottom surface 54, in other words slightly closer to bottom surface 54.

Again as most advantageously shown in FIGS. 4 and 2, positioning arms 73, 74 each include a plurality of substantially circular apertures 90, 91 and 92 at varying heights above data entry housing 15. A respective mating viewing angle pin 93, 94 is formed into each side of display/scanner module 14 for demountable, selectively engaging apertures 90, 91 and 92 and adjusting the angle at which operator 11 views display 50 and the angle with which light scanning beam 62 is projected from display/scanner module 14 when the latter is mounted upon data entry unit housing 15. Viewing angle pins 93, 94 may be spring loaded metal balls dimensioned to snugly engage apertures 90, 91 and 92, and positioning arms 73, 74 formed and dimensioned particularly in thickness to permit an extent of lateral flexibility. In order to best achieve the adjustable positioning explained further hereinbelow, viewing angle pins 93, 94 may be furnished or integrally formed in module case 52 on each side close to bottom surface 54 and closer to second end 56 than first end 55, and the centers of apertures 90, 91 and 92 may be located on positioning arm along the arc traveled by viewing angle pins 93, 94 as the position of display/scanner module 14 is adjusted.

Display/scanner module 14 may be engaged and disengaged very simply. Engaging a display/scanner module 14 disengaged from module carrier 70 is begun by orienting display/scanner module 14 such that the longer, parallel sides of the block forming pivot pins 85 and 86 are aligned with slots 83, 84. In the embodiment described herein such an orientation will place display/scanner module 14 directly above pivot arms 71, 72 and substantially perpendicular to the plane of top surface 16. Display/scanner module 14 is then brought toward data entry unit 15 until pivot pins 85 and 86 pass through slots 83 and 84 and are seated within keyholes 81, 82. Thereafter the second end 56 of display/scanner module 14 is rotated toward the second end of data entry unit housing 15. As spring biased steel ball viewing angle pins 93, 94 contact positioning arms 73, 74, respectively, the latter slightly separates until viewing angle pins 93, 94 are aligned with and seated within apertures 90. Further pressure on the second end 56 of display/scanner module 14 will overcome the spring bias of viewing angle pins 93, 94 and allow that end of display/scanner module 14 to be lowered until viewing angle pins 93, 94 seat in apertures 91. Of course, this simple procedure may be continued for seating in apertures 92 or such other apertures as may be provided. Disengagement of display/scanner module 14 is also simply accomplished by performing the above steps in reverse order.

Overall operation of device 10 may be best appreciated from FIGS. 5 and 6. In FIG. 5 operator 11 is employing device 10 in a handsfree mode with display/scanner module 14 carried thereon to perform point-of-sale functions including scanning a barcode on a label affixed to product 65 to be purchased. In that instance operator 11 adjusts the position of display/scanner module 14 as explained hereinabove to select an optimal viewing angle of display 50 and light scanning beam 62 for the task at hand, and positions neck strap 44 to support device 10 without the use of any hands. Operator 11 is then free to utilize both hands to properly position the barcode for scanning and perform unimpeded other point of sale tasks. And no matter what the position of operator 11, both display 50 and light scanning beam 62 will remain within the operator's line of sight.

In FIG. 6 device 10 is shown being used to scan a barcode 63 on inventory item 64. Again device 10 is supported for handsfree operation by neck strap 44. However, in this example display/scanner module 14 is detached and held in the hand of operator 11 who is activating the scan beam by pressing scan actuation button 60. Operator 11 need only support by hand a very lightweight item, display/scanner module 14, significantly reducing fatigue over periods of long usage. Comfort and ease of use of the detached display/scanner module 14 may be further enhanced by attaching an elastic support strap 96 to the bottom surface 54 of module case 52 and passing several fingers therethrough. Also, operator 11 is always able to view both messages from or to device 10 via display 50 and see the light scanning beam 62 without having to move his head because both are always within the operator's line-of-sight.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of portable data collection and, more particularly, portable devices for handsfree data entry.

We claim:

1. A portable device for data collection by an operator, comprising:
    data entry unit means for entry of data other than by scanning, said data entry unit means operable both while said data entry unit means is carried by hand and while carried on the operator other than by hand;
    display means for display of information;
    scanner means generating a scanning beam for data collection by scanning; and
    module means for housing the display means and scanner means, said module means detachably carried by said data entry unit means and operable and in continuous and identical electronic communication with the data entry unit means both while said module means is carried by said data entry unit means and while detached from said data entry unit means, said module means receiving display information from said data entry unit means and furnishing data collected by scanning to said data entry unit means.

2. A device, as set forth in claim 1, in which said display means and said scanning beam simultaneously appearing in the operator's line-of-sight when said scanner module is carried by said data entry unit means and when detached from said data entry unit means.

3. A device, as set forth in claim 2, wherein said data entry unit means includes module carrier means for adjustably, detachably carrying said module means.

4. A device, as set forth in claim 3, wherein the operator has a line-of-sight, said module carrier means includes first arm means mounted to said data entry unit means for pivotally anchoring said module means and second arm means mounted to said data entry unit means in spaced relation to said first arm means for adjustably positioning said module means relative to the operator's line-of-sight.

5. A device, as set forth in claim 4, wherein said module means includes a case, pivot pin means extending from said case for demountable, rotatably engaging said first arm means, and viewing angle pin means extending from said case for demountable, selectively engaging said second arm means.

6. A device, as set forth in claim 5, wherein said first arm means includes keyhole means for receiving said pivot pin means and slot means for facilitating selective operator engagement and disengagement of said pivot pin means with said keyhole means.

7. A device, as set forth in claim 6, wherein said second arm means includes aperture means for receiving said viewing angle pin means in a plurality of preselectable viewing angle orientations.

8. A device, as set forth in claim 3, wherein said module means further includes cable means for electrically connecting said module means with said data entry unit means, and said module carrier means further includes compartment means for storage of at least a portion of said cable means while said module means is carried by and electrically connected with said data entry unit means.

9. A device, as set forth in claim 8, wherein said compartment means is recessed into said data entry unit means and includes sidewall means for allowing a portion of said cable means to extend outside said compartment means while said module means is fully functional.

10. A device, as set forth in claim 9, wherein said data entry unit means further includes printer means for generating a printed record and paper supply means for furnishing paper to said printer means, said compartment means recessed into said data entry unit means between said printer means and said paper supply means.

11. A device, as set forth in claim 2, wherein said display means includes means for capturing any impression thereon, and said data entry unit means further includes printer means for generating a printed record, said data entry unit means carrying said printer means and detachably carrying said module means in such operational association that when said module means is carried by said data entry unit means said printed record extends over said display means as it is generated by said printer means, whereby any writing on said printed record is captured by said means for capturing.

12. A device, as set forth in claim 2, wherein said data entry unit means further includes reader means for reading card information, data entry means for manually entering information, and printer means for generating a printed record.

13. A device, as set forth in claim 12, wherein said data entry unit means further includes carrying means for removably securing the device to the operator to facilitate maintaining the device in an operational orientation when said data entry unit means is not carried by hand.

14. A device, as set forth in claim 13, wherein said carrying means is one of a neck strap and means for affixing the device to an article of clothing.

15. A device, as set forth in claim 12, wherein said data entry unit means has a housing and further includes record holder means for temporarily storing at least a portion of said printed record mounted upon the outside of said housing.

16. A device, as set forth in claim 12, wherein said data entry unit means further includes means for communicating with a transceiver external to said device, a portable power supply for furnishing electrical power to the device, and processor means for controlling said display means, said scanner means, said reader means, said data entry means, said printer means, and said means for communicating.

17. A portable device for data collection by an operator, comprising:
  data entry unit means for entry of data other than by scanning, said data entry unit means operable both while said data entry unit means is carried by hand and while carried on the operator other than by hand, said data entry unit means having a first end and a second end and including
    reader means for reading card information and carried within said housing substantially adjacent to said first end of said housing,
    keypad means for manually entering information,
    printer means for generating a printed record and carried within said housing nearer said second end of said housing, and,
    carrying means for removably securing the device to the operator to facilitate maintaining the device in an operational orientation when said data entry unit means is not carried by hand; and,
    module means for display of information and data collection by scanning,
  said module means detachably carried by said data entry unit means and operable both while said module means is carried by said data entry unit means and while detached from said data entry unit means, said module means receiving display information from said data entry unit means and furnishing data collected by scanning to said data entry unit means, said module means including
    display means for display of information,
    scanner means generating a scanning beam for data collection by scanning, said display means and said scanning beam simultaneously appearing in the operator's field-of-vision when said scanner module is carried by said data entry unit means and when detached from said data entry unit means, and,
    module carrier means for adjustably, detachably carrying said module means substantially adjacent said second end of said housing and between said second end of said housing and said printer means.

* * * * *